(12) United States Patent
Benjamin et al.

(10) Patent No.: US 12,135,920 B2
(45) Date of Patent: *Nov. 5, 2024

(54) GENERATING DESIGNS FOR MULTI-FAMILY HOUSING PROJECTS USING HISTORICAL DESIGN TRENDS

(71) Applicant: AUTODESK, INC., San Francisco, CA (US)

(72) Inventors: David Benjamin, Brooklyn, NY (US); Dale Zhao, New York, NY (US); Lorenzo Villaggi, Brooklyn, NY (US)

(73) Assignee: AUTODESK, INC., San Francisco, CA (US)

(*) Notice: Subject to any disclaimer, the term of this patent is extended or adjusted under 35 U.S.C. 154(b) by 802 days.

This patent is subject to a terminal disclaimer.

(21) Appl. No.: 17/099,708

(22) Filed: Nov. 16, 2020

(65) Prior Publication Data

US 2021/0150084 A1 May 20, 2021

Related U.S. Application Data

(60) Provisional application No. 62/937,185, filed on Nov. 18, 2019.

(51) Int. Cl.
*G06F 30/13* (2020.01)
*G06F 30/12* (2020.01)
(Continued)

(52) U.S. Cl.
CPC ............. *G06F 30/13* (2020.01); *G06F 30/12* (2020.01); *G06F 30/20* (2020.01); *G06F 2111/02* (2020.01); *G06F 2111/04* (2020.01)

(58) Field of Classification Search
CPC .......... G06F 30/00; G06F 30/13; G06F 30/20; G06F 2111/02; G06F 2111/04; G06Q 10/00
(Continued)

(56) References Cited

U.S. PATENT DOCUMENTS

2016/0088438 A1* 3/2016 O'Keeffe ............... H04R 1/023
455/456.2

OTHER PUBLICATIONS

Beirao, Jose Nuno, "CityMaker Designing Grammars for Urban Design", 2012, AB Architecture and Built Environment. (Year: 2012).*

(Continued)

*Primary Examiner* — Cedric Johnson
(74) *Attorney, Agent, or Firm* — Artegis Law Group, LLP

(57) ABSTRACT

A design engine is configured to automatically generate designs for multi-family housing projects that simultaneously meet local construction regulations while also meeting specific financial targets. The design engine includes a design analyzer that generates design trends based on a database of historical designs. A feature extractor within the design analyzer performs a geometrical analysis of the historical designs to generate a library of features. A feature parameterizer within the design analyzer performs a parameterization process to generate one or more parametric values for each feature. A parameter correlator within the design analyzer compares different subsets of parametric values to identify relationships between those values. A trend aggregator identifies relationships that occur across multiple historical designs to determine a set of design trends. The design engine generates design options using the design trends. Design options generated in this manner include design features that historically promote both feasibility and desirability.

20 Claims, 6 Drawing Sheets

(51) Int. Cl.
  *G06F 30/20* (2020.01)
  *G06F 111/02* (2020.01)
  *G06F 111/04* (2020.01)

(58) Field of Classification Search
  USPC .......................................................... 703/1
  See application file for complete search history.

(56) References Cited

OTHER PUBLICATIONS

Bortoluzzi, Brandon et al., "Automating the Creation of Building Information Models for Existing Buildings", May 31, 2019, Automation in Construction 105, Elsevier B.V. (Year: 2019).*

* cited by examiner

S1: V1, V2, D1, A1  S3: V5, V6, D3, A3

S2: V3, V4, D2, A2  S4: V7, V8, D4, A4

R1: D1 = D2 • C1  R3: D3 = D4 • C1

R2: A1 = A2  R4: A3 = A4

FIG. 4C $$T1: D\left(S\genfrac{}{}{0pt}{}{PARCEL}{MAX}\right) = D\left(S\genfrac{}{}{0pt}{}{BUILDING}{MAX}\right) \cdot C1$$

$$T2: A\left(S\genfrac{}{}{0pt}{}{PARCEL}{MAX}\right) = A\left(S\genfrac{}{}{0pt}{}{BUILDING}{MAX}\right)$$

FIG. 4D

GENERATING DESIGNS FOR MULTI-FAMILY HOUSING PROJECTS USING HISTORICAL DESIGN TRENDS

CROSS-REFERENCE TO RELATED APPLICATIONS

This application claims the priority benefit of U.S. provisional patent application titled, "Generative Design Techniques for Multi-Family Housing Projects," filed on Nov. 18, 2019 and having Ser. No. 62/937,185. The subject matter of this related application is hereby incorporated herein by reference.

BACKGROUND

Field of the Various Embodiments

The various embodiments relate generally to computer-aided design technology and, more specifically, to generating designs for multi-family housing projects using historical design trends.

Description of the Related Art

A residential design company or other organization occasionally generates designs on a "speculative" basis by identifying an undeveloped parcel of land that is zoned for residential development and then proposing a design for a multi-family housing project to the landowner who owns the parcel. If the landowner approves of the proposed design, or some version thereof, then the landowner can engage with the residential design organization to develop the parcel according to the proposed design. Once the multi-family housing project is complete, the landowner typically rents or leases the individual housing units within the multi-family housing project to different families in order to provide those families with housing and to generate a recurring revenue stream. In this fashion, the residential design company or other organization benefits landowners who own undeveloped parcels as well as families in need of housing.

A residential design company or other organization that operates on a "speculative" basis usually includes a design team that is tasked with generating different designs for target multi-family housing projects. The design team typically uses computer-aided design (CAD) software or similar software to generate the different designs. One of the challenges faced when generating a given design is how to optimally position various design elements, such as buildings, parking lots and spaces, walkways, and other common design elements relative to the property boundaries of a given undeveloped parcel of land. Another challenge faced when generating a given design is ensuring that the design is compliant with local construction regulations and, accordingly, considered "feasible" to regulators and also ensuring that the design meets specified financial targets and, accordingly, is considered "desirable" to landowners.

The different designs generated by a design team conceptually occupy distinct positions within a multi-dimensional "design space" that encompasses the universe of possible designs that could be generated for a given undeveloped parcel of land. Most of the designs included in the design space are either unfeasible or undesirable or both because those designs do not comply with the relevant construction regulations and/or do not meet the relevant financial targets. A small number of designs included in the design space are considered both feasible and desirable because those designs both comply with the relevant construction regulations and meet the relevant financial targets. Feasible and desirable designs are comparatively scarce in the design space because design features that promote compliance with construction regulations tend to reduce financial performance and, similarly, design features that promote financial performance tend to reduce compliance with regulations. During the design process, the design team explores the design space in an attempt to generate as many designs as possible that are considered both feasible and desirable. As a general matter, the greater the number of feasible and desirable designs that can be generated, the greater the likelihood that an optimal design for a given target project can be determined.

One drawback of current approaches to generating designs for multi-family housing projects is that conventional CAD software is not configured to effectively navigate the design space and steer the design process towards regions of the design space where both feasible and desirable designs reside. In this regard, one limitation of conventional CAD software is that conventional CAD software does not incorporate functionality to automatically generate design features that promote both regulatory compliance and financial performance when traversing the overall design space. Consequently, designs generated using conventional CAD software are predominately infeasible, undesirable, or both, which substantially reduces the likelihood of determining an optimal design for a given target project. Another limitation of conventional CAD software is that conventional CAD software does not incorporate functionality to automatically modify a given design based on feedback received from a landowner without adversely impacting either the desirability or the feasibility of the design, which further reduces the likelihood of determining an optimal design for a given target project.

As the foregoing illustrates, what is needed in the art are more effective techniques for generating designs for multi-family housing projects.

SUMMARY

Various embodiments include a computer-implemented method for generating designs for multi-family housing projects via a computer-aided design (CAD) application, including generating, via a feature extractor included in the CAD application, a set of features based on a geometric analysis of a plurality of historical designs, generating, via a feature parameterizer included in the CAD application, a set of parametric values based on a parameterization of the set of features, determining, via a parametric correlator included in the CAD application, a first correlation between a first subset of parametric values and a second subset of parametric values included in the set of parametric values, generating, via a trend aggregator included in the CAD application, a first design trend based on the first correlation, and generating a first design option based on the first design trend.

At least one technical advantage of the disclosed techniques relative to the prior art is that the disclosed techniques can be incorporated into a CAD application to enable the CAD application to automatically generate designs having design features that promote both regulatory compliance and financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to modify a given design relative to landowner feedback to include design features that promote the feasibility and/or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to generate designs that incorporate design elements derived from previously successful designs, further promoting design feasibility and/or desirability. These technical advantages represent tangible and meaningful technological improvements over conventional CAD applications.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 4A-4D illustrate how the design analyzer of FIG. 2 generates a design trend based on historical design data, according to various embodiments.

DETAILED DESCRIPTION

Figure 1:
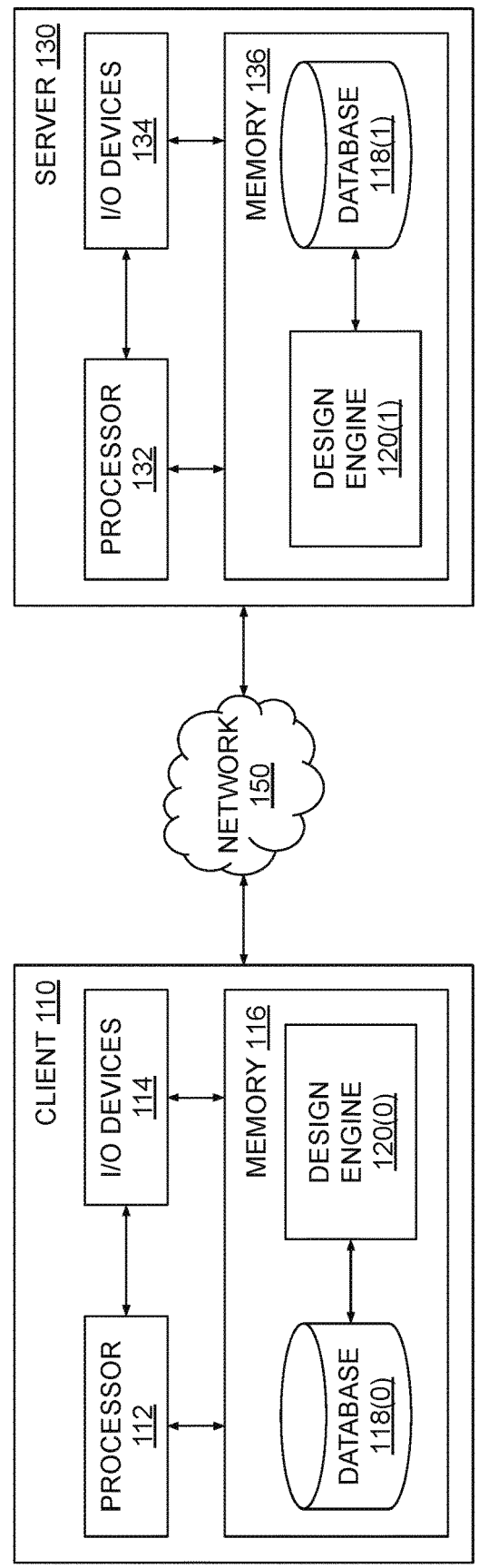
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, a residential design company or other organization that operates on a "speculative" basis typically includes a design team that uses conventional CAD software to generate designs for multi-family housing projects. When generating designs, the design team typically has to work within the guidelines of local construction regulations to generate designs that are considered "feasible" to regulators and also has to work towards specific financial targets to generate designs that are considered "desirable" to landowners. Designs generated using conventional CAD software conceptually occupy distinct positions within a multi-dimensional "design space" that encompasses the universe of possible designs that could be generated for a given undeveloped parcel of land. A very small number of designs included in the design space are considered both feasible and desirable. This situation poses specific difficulties that conventional CAD software cannot effectively address.

In particular, conventional CAD software cannot effectively navigate the design space towards regions of the design space where feasible and desirable designs reside. Consequently, designs generated using conventional CAD software are predominately infeasible, undesirable, or both, which frequently causes landowners to reject most designs for multi-family housing projects. Conventional CAD software also cannot usually be used to modify a given design to incorporate feedback received from a landowner without adversely impacting either the desirability or the feasibility of the design, further limiting the success rate of designs generated via conventional CAD software.

To address these issues, various embodiments include a design engine that is configured to automatically generate designs for multi-family housing projects that simultaneously meet local construction regulations while also meeting specific financial targets. The design engine includes a design analyzer that generates design trends based on a database of historical designs. A feature extractor within the design analyzer performs a geometrical analysis of the historical designs to generate a library of features. A feature parameterizer within the design analyzer performs a parameterization process to generate one or more parametric values for each feature. A parameter correlator within the design analyzer compares different subsets of parametric values to identify relationships between those values. A trend aggregator identifies relationships that occur across multiple historical designs to determine a set of design trends. The design engine generates design options using these design trends. Design options generated in this manner include design features that historically promote both feasibility and desirability.

The design engine further includes a site analyzer, a design generator, and a design evaluator. The site analyzer generates design criteria based on relevant construction regulations. The design generator generates design options that reflect the design trends discussed above while also complying with the construction regulations set forth in the design criteria. The design evaluator analyzes the design options and generates various design metrics. The design metrics describe specific geometric properties of the design options as well as various financial projections associated with those design options. Based on the design metrics, the design generator generates additional design options that better meet the design criteria. The design engine and design evaluator operate iteratively in this manner to generate successively improved design options. During or after any given iteration, one or more of the design options can be modified based on user input. Subsequently, as needed, the modified design option(s) can be brought into compliance with construction regulations and/or modified to improve financial performance.

At least one technical advantage of the disclosed techniques relative to the prior art is that the disclosed techniques can be incorporated into a CAD application to enable the CAD application to automatically generate designs having design features that promote both regulatory compliance and financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to modify a given design relative to landowner feedback to include design features that promote the feasibility and/or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to generate designs that incorporate design elements derived from previously successful designs, further promoting design feasibility and/or desirability. These technical advantages represent tangible and meaningful technological improvements over conventional CAD applications.

System Overview

FIG. 1 illustrates a system configured to implement one or more aspects of the various embodiments. As shown, a system 100 includes a client 110 and a server 130 coupled together via a network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and/or a touchscreen, among others.

Memory 116 includes any technically feasible storage media configured to store data and software applications, such as, for example, a hard disk, a random-access memory (RAM) module, and/or a read-only memory (ROM). Memory 116 includes a database 118(0) and a design engine 120(0). Database 118(0) stores various data that is processed by design engine 120(0). Design engine 120(0) is a software application that, when executed by processor 112, interoperates with a corresponding software application executing on server 130 to perform various operations described in greater detail herein.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, and/or a touchscreen, among others.

Memory 136 includes any technically feasible storage media configured to store data and software applications, such as, for example, a hard disk, a RAM module, and/or a ROM. Memory 136 includes a database 118(1) and a design engine 120(1). Database 118(1) stores various data that is processed by design engine 120(1). Design engine 120(1) is a software application that, when executed by processor 132, interoperates with design engine 120(0) executing on client 110 to perform the various operations described in greater detail herein.

As a general matter, databases 118(0) and 118(1) represent separate portions of a distributed storage entity. Thus, for simplicity, databases 118(0) and 118(1) are collectively referred to hereinafter as database 118. Similarly, design engines 120(0) and 120(1) represent separate portions of a distributed software entity that is configured to perform any and all of the inventive operations described herein. Thus, for simplicity, design engines 120(0) and 120(1) are collectively referred to hereinafter as design engine 120.

In operation, design engine 120 is configured to automatically generate design options for multi-family housing projects that can be constructed on a given parcel of land. Design engine 120 is configured to generate the design options based on historical design trends as well as local construction regulations that govern development of the parcel of land. Design engine 120 analyzes the design options to identify those with projected financial performance that may be desirable to a landowner who owns the undeveloped parcel of land. Design engine 120 is further configured to incorporate into the identified design options various types of modifications that may be suggested by the landowner while maintaining compliance with local construction regulations. In this manner, design engine 120 is configured to support a "speculative" approach to multi-family housing project design and development.

Software Overview

Figure 2:
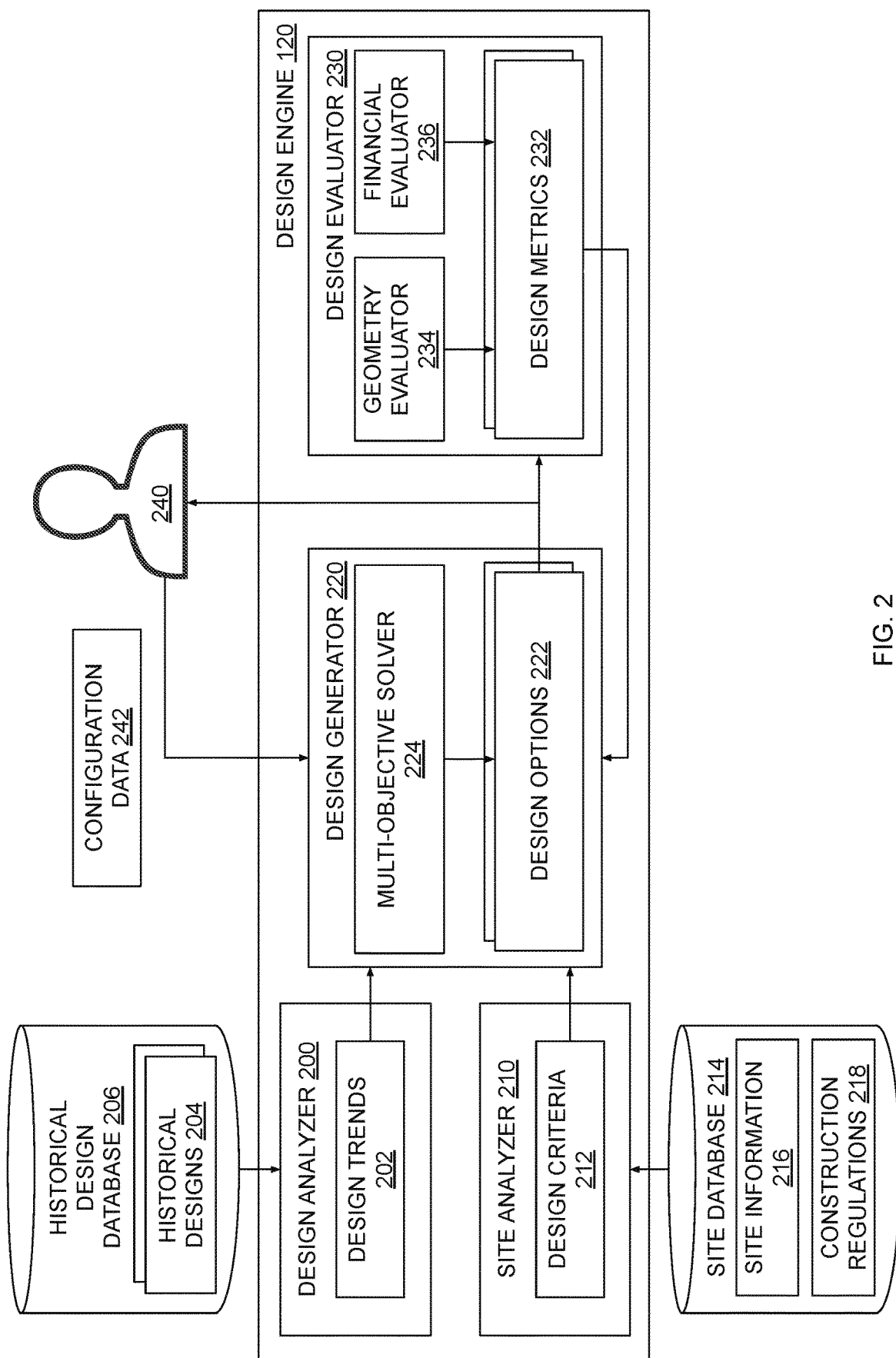
FIG. 2 is a more detailed illustration of the design engine of FIG. 1, according to various embodiments.

FIG. 2 is a more detailed illustration of the design engine of FIG. 1, according to various embodiments. As shown, design engine 120 includes a design analyzer 200, a site analyzer 210, a design generator 220, and a design evaluator 230. These various software modules are configured to interoperate with one another in order to implement the various operations performed by design engine 120.

Design analyzer 200 is configured to generate design trends 202 based on an analysis of historical designs 204 that reside within historical design database 200. Historical designs 204 generally include designs for multi-family housing projects that were previously accepted by landowners and used to develop corresponding parcels of land. Design trends 202 generally include geometric construction rules that can be used to generate designs having similar features to historical designs 204. Design analyzer 200 generates design trends 202 by performing a geometric analysis of historical designs 204 to extract a set of features from those designs and then parameterizing the extracted features to produce a set of parametric values. Design analyzer 200 determines various relationships between individual subsets of parametric values to generate one or more design trends 202.

For example, design analyzer 200 could analyze a set of historical designs 204 in which various apartment complexes are aligned in an East-West direction. Design analyzer 200 could extract an alignment feature from each historical design 204 and then parameterize the extracted features to generate a set of values representing the alignment of the various apartment complexes. Design analyzer 200 could then determine that the various parametric values are correlated with each other and generate a design trend 202 indicating that an East-West alignment for apartment complexes is preferable when generating design options 222. Persons skilled in the art will understand how these techniques can be applied to generate design trends 202 representing any technically feasible feature of historical designs 204.

Site analyzer 210 is configured to generate design criteria 212 based on an analysis of site information 214 and construction regulations 216 stored in site database 218. Site information 214 includes data and metadata associated with a given parcel of land, including a geographic location, a set of property boundaries, a property area value, geometric attributes of the parcel such as topology and/or topography, and so forth. Construction regulations 216 include various zoning regulations, building codes, land use requirements, and other types of governances that dictate how development of the parcel of land can and/or should occur. Construction regulations 216 may be applicable based on the geographic location of the parcel of land or specifically applicable to the parcel of land for various reasons.

Site analyzer 210 processes site information 214 and construction regulations 216 to synthesize a set of design criteria 212 that feasible designs should meet. A given design criterion 212 may include a design objective or a design constraint. A design objective could be, for example, that designs should maximize the amount of area that is devoted to buildings versus landscaping or other design features. A given design constraint could be, for example, that designs should not include buildings that are placed outside of property boundaries or exceed a given height.

Design generator 220 is configured to process design trends 202 and design criteria 212 in order to generate successive generations of design options 222. Each design option 222 describes a multi-family housing project corresponding to the parcel of land described in site information 214. Design generator 220 performs various geometric construction techniques to generate, for each design option 222, geometry that describes one or more buildings, parking lots and spaces, walkways, landscaping features, and other design elements typically found in multi-family housing projects. In one embodiment, design generator 220 may include a multi-objective solver 224 that is configured to implement a set of mathematical optimization algorithms to generate the various design elements found in each design option 222.

Design evaluator 230 is configured to generate various design metrics 232 that quantify specific attributes of design options 222. In particular, design evaluator 230 includes a geometry evaluator 234 that evaluates geometric attributes of design options 222 as well as a financial evaluator 236 that evaluates financial attributes of design options 222. Geometric evaluator 234 can generate any technically feasible type of metric associated with the geometry of a given design option 222, including the total square footage of the design option, the overall habitable volume of the design option, the floor area ratio (FAR) of the design option, the building coverage ratio (BCR) of the design option, and so forth. Financial evaluator 236 can generate any technically feasible type of metric that describes financial projections for a given design option 222, including the construction cost of the design option, the projected rental revenue of the design option, the return on-investment (ROI) associated with the design option, and so forth. In various embodiments, geometric evaluator 234 and/or financial evaluator 236 can be used to quantify the degree to which design criteria 212 are met.

Design evaluator 230 generates design metrics 232 via geometry evaluator 234 and financial evaluator 236 and then provides those design metrics to design generator 220 in order to inform the generation of additional design options 222. In this manner, design generator 220 and design evaluator 230 operate iteratively in order to generate successive generations of design options 222 having design metrics 232 that improve over time while continuing to meet design criteria 212 and construction regulations 216. When certain convergence criteria are met, design generator 220 outputs design options 222 to user 240. In various embodiments, multi-objective solver 224 implements one or more evolutionary and/or genetic algorithms in order to modify design options 222, based on corresponding design metrics 232, in order to generate successive generations of design options 222. Via the above techniques, design generator 220 is configured to explore a vast multi-dimensional design space that includes a multitude of design options 222 having widely varying characteristics. With conventional CAD software, only a small subset of this design space is accessible, leading to designs that are either infeasible, undesirable, or both.

In one embodiment, design generator 220 is configured to obtain configuration data 242 from a user 240 and to then generate and/or modify design options 222 based on that data. Configuration data 242 may include any technically feasible type of data that can be used to guide the generation of design options 222, including financial targets for design options 222, design preferences related to the layout and/or orientation of buildings within the multi-family housing project, target occupancy metrics for the multi-family housing project, design rules and/or constraints that reflect various aesthetic preferences of user 240 and/or the landowner, landowner feedback in general, and so forth.

In various embodiments, design engine 120 may perform computer simulations of various design elements included in each design option 222 to generate one or more designs. Design engine 120 may then render those designs for display to a user via a display device. Design engine 120 may also generate a graphical user interface (GUI) and render the GUI for display to the user via the display device. Using one or more input devices, the user may then interact with the rendered design(s) using the GUI in order to input feedback, after design criteria, and make other modifications to those designs. Design engine 120 may then run further simulations to generate additional design options 222 and then render updated designs for display to the user.

Advantageously, the techniques described above can be incorporated into CAD software to enable the CAD software to automatically generate and/or modify designs for multi-family housing projects that balance the competing objectives of complying with complex construction regulations and simultaneously achieving target financial projections. Accordingly, CAD software that implements the disclosed techniques can reliably and deterministically generate designs for multi-family housing projects that are considered both feasible from a regulatory standpoint and desirable from a financial performance perspective.

Generating Design Options Using Historical Design Trends

Figure 3:
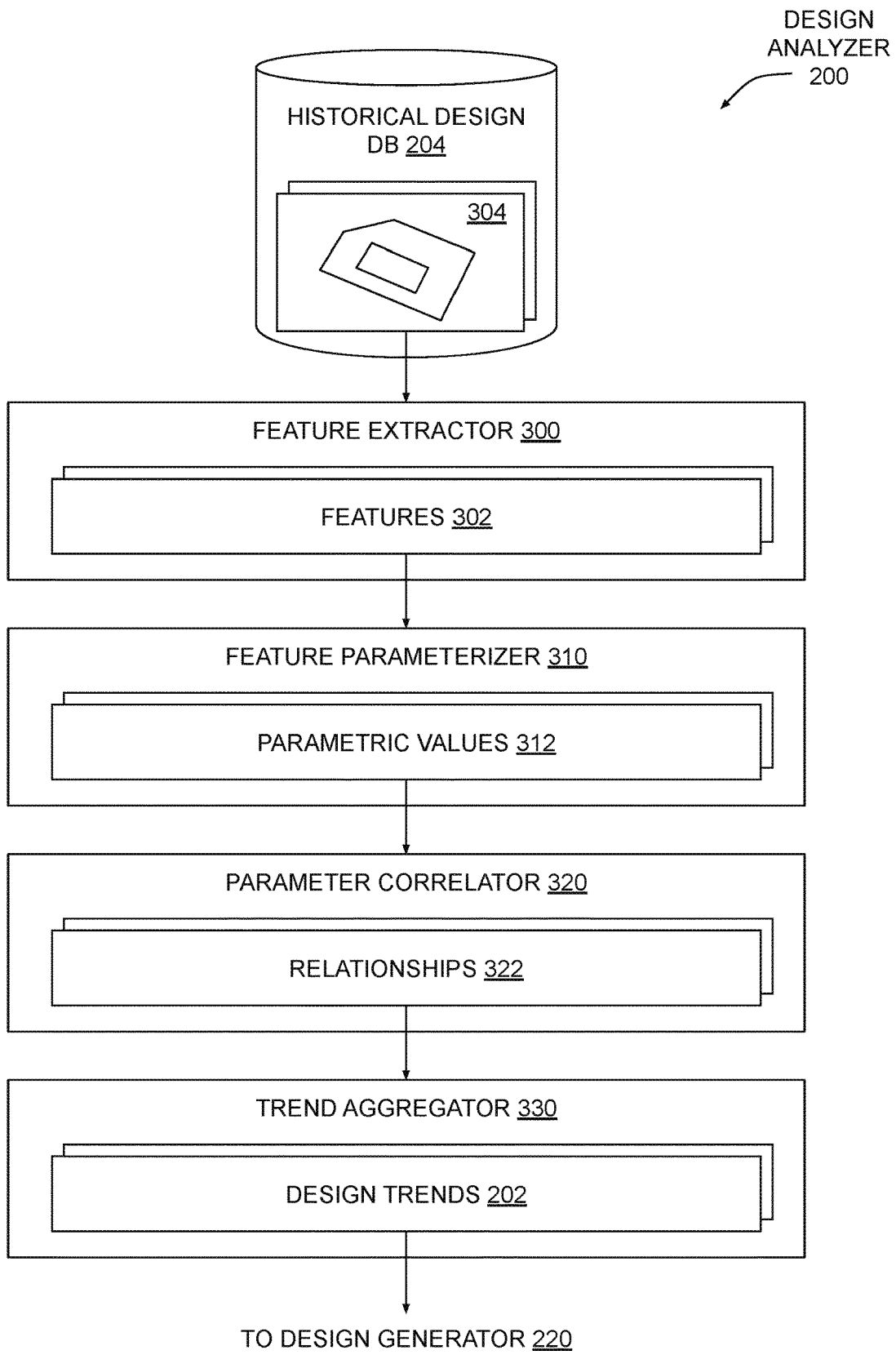
FIG. 3 is a more detailed illustration of the design analyzer of FIG. 2, according to various embodiments.

FIG. 3 is a more detailed illustration of the design analyzer of FIG. 2, according to various embodiments. As shown, design analyzer 200 includes a feature extractor 300, a feature parameterizer 310, a parameter correlator 320, and a trend aggregator 340. These various software modules are configured to interoperate with one another in order to implement the various operations performed by design analyzer 200.

Feature extractor 300 is configured to generate features 302 by performing a geometric analysis of historical designs 204 stored in historical design database 206. Each feature 302 generally represents a specific geometric attribute, or collection thereof, that is derived from a specific portion of a corresponding historical design 204. For example, a given feature 302 could be a line segment extracted from a geometric shape that represents a building defined in a corresponding historical design 204. In another example, a given feature 302 could be a rectangle, composed of various edges and corners, that is derived from a corresponding historical design 204. In various embodiments, each feature 302 may include a grid of pixels, a collection of vertices, or a portion of an image. Feature extractor 300 may implement any technically feasible approach to feature extraction when generating features 302, including techniques derived from computer vision, machine learning, and other types of artificial intelligence.

Feature parameterizer 310 is configured to generate parametric values 312 by performing a parameterization process based on features 302. A given set of parametric values 312 numerically defines a corresponding feature 302. For example, a pair of vertices included in parametric values 312 could define a line segment. In another example, a set of four vertices included in parametric values could define a rectangle. Feature parameterizer 310 may implement any technically feasible approach to parameterization when generating parametric values 310, including mesh parameterization, vector-based approaches, and so forth.

Parameter correlator 320 is configured to generate relationships 322 by identifying correlations between different subsets of parametric values 312 that correspond to different features 302. A relationship 322 between any two subsets of parametric values 312 generally indicates that the features 302 corresponding to those two subsets of parametric values 312 are geometrically similar. For example, a given relationship 322 could indicate that a first line segment defined by a first set of parametric values 312 has a similar length to a second line segment defined by a second set of parametric values 312. In another example, a given relationship 322 could indicate that a first geometric shape defined by a first set of parametric values 312 has a similar orientation as a second geometric shape defined by a second set of parametric values 312. Parameter correlator 320 may implement any technically feasible approach to identifying correlations or other types of relationships between parametric values 312, including scale-invariant feature transforms and feature matching, among others.

Trend aggregator 330 is configured to generate design trends 202, also shown in FIG. 2, by identifying similar or repeating relationships 322. A given design trend 202 therefore indicates that a particular type of relationship 322 between subsets of parametric values 312 corresponding to distinct features 302 occurs across multiple historical designs 204, thereby establishing a pattern or "trend." For example, suppose a first relationship 322 indicates that the longest side of a building defined in a first historical design 204 is aligned with the longest side of an adjacent property boundary defined in the first historical design 204. Suppose also that a second relationship 322 indicates that the longest side of a building defined in a second historical design 204 is aligned with the longest side of an adjacent property boundary defined in the second historical design 204. Trend aggregator 330 could determine that these two relationships establish a pattern and then generate a design trend 202 indicating that the longest side of any budding should be aligned with the longest side of an adjacent property boundary. Any given design trend 202 could promote compliance with construction regulations, adherence to financial targets, or both. As a general matter, a given design trend 202 represents a design rule that is applicable across multiple historical designs 204, as described in a more detailed example below in conjunction with FIG. 4.

Figure 4A:
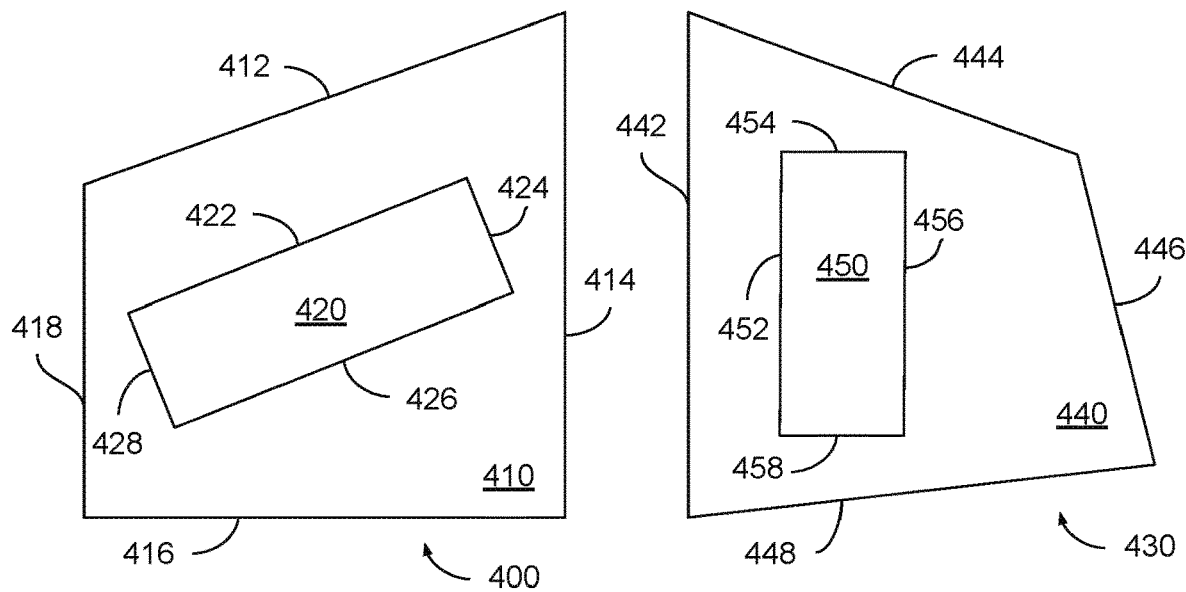
Figure 4B:
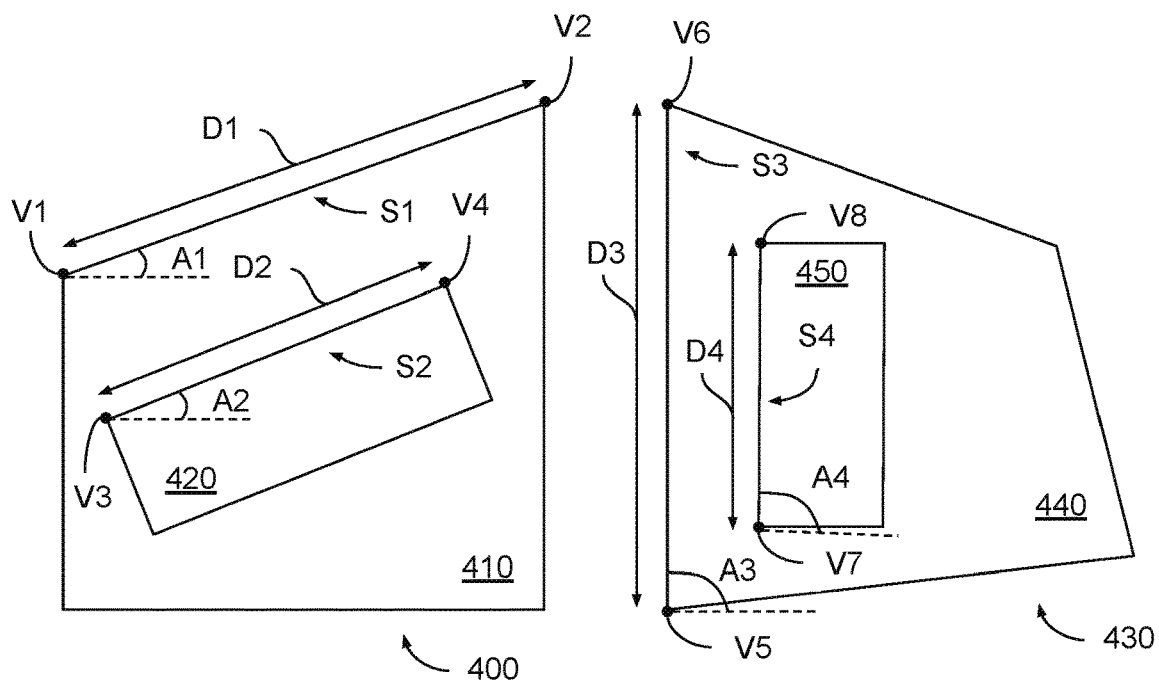

FIGS. 4A-4C illustrate how the design analyzer of FIG. 2 generates a design trend based on historical designs, according to various embodiments. In the example discussed herein, the various modules of design analyzer 200 are configured to analyze historical designs 400 and 430 in order to generate exemplary design trends.

Referring now to FIG. 4A, a historical design 400 includes a parcel 410 of land and a building 420. Similarly, a historical design 430 includes a parcel 440 of land and a building 450. Feature extractor 300 analyzes historical design 400 to identify property boundaries 412, 414, 416, and 418 as well as building boundaries 422, 424, 426, and 428. Feature extractor 300 also analyzes historical design 430 to identify property boundaries 442, 444, 446, and 448 as well as building boundaries 452, 454, 456, and 458. Feature extractor 300 generates a different feature 302 for each of the identified boundaries. Feature extractor 300 could implement, for example, a line detection algorithm in order to identify the different boundaries as features 302.

Referring now to FIG. 4B, feature parameterizer 310 analyzes the various boundaries identified by feature extractor 300 and then generates one or more parametric values 312. Relative to historical design 400, feature parameterizer 310 generates a subset S1 of parametric values 312 to define property boundary 412 that includes vertices V1 and V2 along with angle A1 and length D1. Feature parameterizer 310 also generates another subset S2 of parametric values 312 to define building boundary 422 that includes vertices V3 and V4 along with angle A2 and length D2. Relative to historical design 430, feature parameterizer 310 generates a subset S3 of parametric values 312 to define property boundary 442 that includes vertices V5 and V6 along with angle A3 and length D3. Feature parameterizer 310 also generates another subset S4 of parametric values 312 to define budding boundary 452 that includes vertices V7 and V8 along with angle A4 and length D4. Subsets S1 through S4 are also tabulated in FIG. 4C. Feature parameterizer 310 may generate parametric values for other features of historical designs 400 and 430, although these other features and the parameterizations thereof are not relevant to this particular example.

Referring now to FIG. 4C, parameter correlator 320 analyzes the various sets of parametric values S1, S2, S3, and S4 generated by feature parameterizer 310 and then identifies specific relationships between those sets of parametric values. In particular, relative to historical design 400, parameter correlator 320 identifies a relationship R1 indicating that length D1 is equal to length D2 multiplied by proportionality constant C1. Parameter correlator 320 also identifies a relationship R2 indicating that angle A1 is equal to angle A2. Relative to historical design 430, parameter correlator 320 identifies a relationship R3 indicating that length D3 is equal to length D4 multiplied by the proportionality constant C1. Parameter correlator 320 also identifies a relationship R4 indicating that angle A3 is equal to angle A4.

Referring now to FIG. 4D, trend aggregator 330 analyzes relationships R1, R2, R3, and R4 generated via parametric correlator 320 and then establishes trends that reflect repeating patterns in those relationships. Specifically, trend aggregator 330 generates design trend T1, which indicates that the length of the longest side of any given parcel is proportional, via proportionality constant C1, to the length of the longest side of a building that occupies parcel. Trend aggregator 330 also generates design trend T2, which indicates that an angle associated with the longest side of any given parcel is equal to an angle associated with the longest side of a building that occupies parcel.

Referring generally to FIGS. 4A-4D, design analyzer 200 performs the above techniques across a vast collection of historical designs 204 that were previously accepted for development by landowners in order to establish design trends 202 that at least partially reflect design features that led to the success of those designs. Based on design trends 202, design generator 220 can then generate and/or modify design options 222 to include these design features. In so doing, design generator 220 automatically navigates the design space mentioned above using design trends 202 to guide exploration and to generate additional design options 222. Because design options 222 that are generated or modified in this manner include design features that are derived from design trends 202 that reflect previously successful designs, those design options have a higher likelihood of being feasible from a regulatory standpoint and desirable from a financial perspective than designs generated via conventional CAD software. In one embodiment, design analyzer 200 may generate different sets of design trends 202 for different regions that potentially have different construction regulations 218 in order to increase the likelihood that a given design option 222 complies with the relevant construction regulations 218. In another embodiment, design features that are derived from design trends 202 may be incorporated into design options 222 during modification relative to landowner feedback in order to maintain compliance with construction regulations as well as adherence to financial targets.

Figure 5:
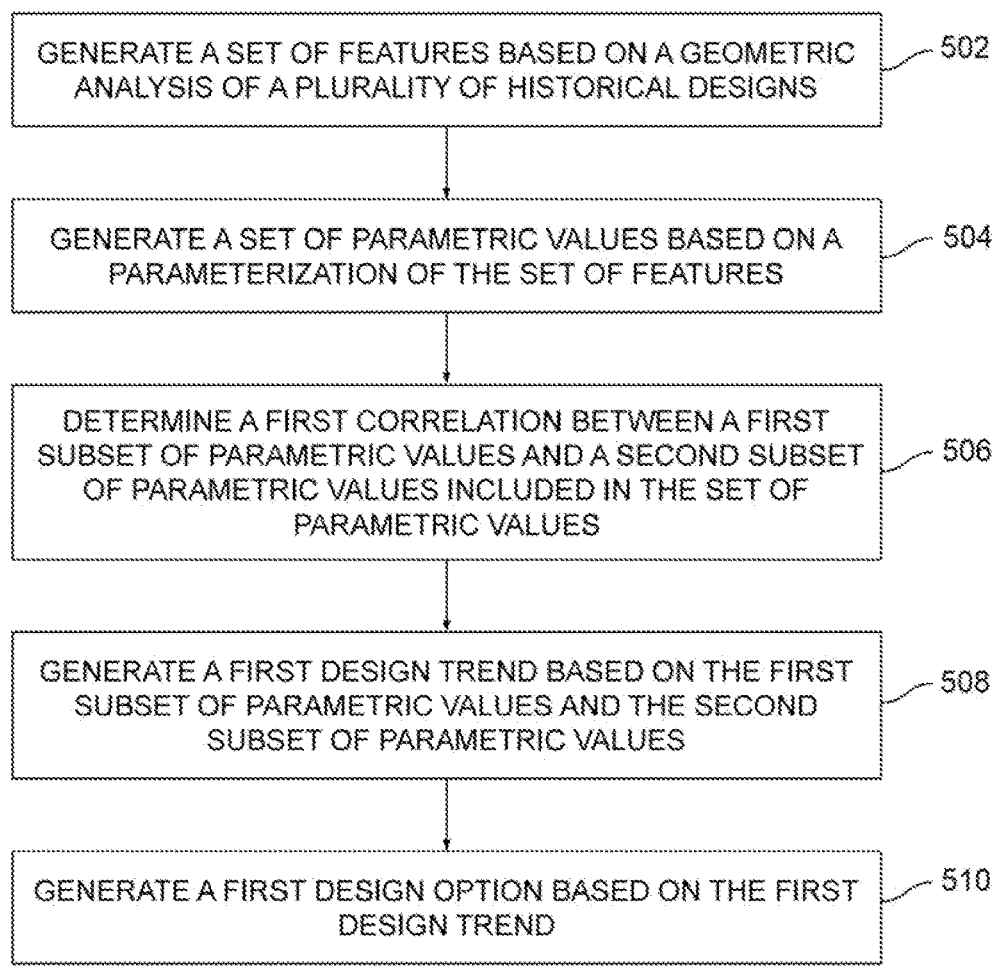
FIG. 5 is a flow diagram of method steps for generating design options for a multi-family housing project, according to various embodiments.

FIG. 5 is a flow diagram of method steps for generating a design for a multi-family housing project using historical designs, according to various embodiments. Although the method steps are described in conjunction with the systems of FIGS. 1-4, persons skilled in the art will understand that any system configured to perform the method steps in any order falls within the scope of the present embodiments.

As shown, a method 500 begins at step 502, where feature extractor 300 within design analyzer 200 generates a set of features based on a geometric analysis of a plurality of historical designs 204. In one embodiment, feature extractor 300 may perform the geometric analysis on a given historical design 204 by performing a series of convolution operations with different subsets of pixels that collectively define the historical design 204. Persons skilled in the art will understand any technically feasible approach to feature detection and/or extraction falls within the scope of operations performed by feature extractor 300. In various embodiments, each feature 302 may include a grid of pixels, a collection of vertices, or a portion of an image, among others.

At step 504, feature parameterizer 310 within design analyzer 200 generates a set of parametric values 312 based on a parameterization of the set of features 302. One or more parametric values 312 numerically defines a corresponding feature 302. For example, a pair of vertices included in parametric values 312 could define a line segment. In another example, a set of four vertices included in parametric values could define a rectangle. Feature parameterizer 310 may implement any technically feasible approach to parameterization when generating parametric values 310, including mesh parameterization, vector-based approaches, and so forth. In one embodiment, feature parameterizer 310 may generate a mathematical equation to define each feature 302.

At step 506, parameter correlator 320 within design analyzer 200 determines a first relationship 322 between a first subset of parametric values and a second subset of parametric values included in the set of parametric values. A given relationship 322 between any two subsets of parametric values 312 generally indicates that the features 302 corresponding to those two subsets of parametric values 312 are geometrically similar. For example, a given relationship 322 could indicate that a first line segment defined by a first set of parametric values 312 has a similar length to a second line segment defined by a second set of parametric values 312. In another example, a given relationship 322 could indicate that a first geometric shape defined by a first set of parametric values 312 has a similar orientation as a second geometric shape defined by a second set of parametric values 312. Parameter correlator 320 may implement any technically feasible approach to identifying correlations or other types of relationships between parametric values 312, including scale-invariant feature transforms and feature matching, among others.

At step 508, trend aggregator 330 within design analyzer 200 generates a first design trend 202 based on the first subset of parametric values and the second subset of parametric values. A given design trend 202 indicates that a particular type of relationship 322 between subsets of parametric values 312 corresponding to distinct features 302 occurs across multiple historical designs 204, thereby establishing a pattern or "trend." For example, suppose a first relationship 322 indicates that the longest side of a building defined in a first historical design 204 is aligned with the longest side of an adjacent property boundary defined in the first historical design 204. Suppose also that a second relationship 322 indicates that the longest side of a budding defined in a second historical design 204 is aligned with the longest side of an adjacent property boundary defined in the second historical design 204. Trend aggregator 330 could determine that these two relationships establish a pattern and then generate a design trend 202 indicating that the longest side of any building should be aligned with the longest side of an adjacent property boundary. This particular example is explored above in conjunction with FIGS. 4A-4D.

At step 510, design generator 220 generates a first design option 222 based on the first design trend 202. In doing so, design generator 220 generates one or more design elements, including buildings, parking spaces, landscaping features, and portions thereof, in a manner that is consistent with the first design trend 202. In one embodiment, multi-objective solver 224 may generate the first design option via a topology optimization process. Because design trends 202 are derived from historical designs 204 that were previously considered both feasible and desirable, and were therefore accepted by landowners for development, design options 222 generated based on design trends 202 are more likely to also be considered feasible and desirable. Accordingly, with the disclosed approach, design generator 220 can generate design options 222 that may be accepted by landowners for development more frequently than designs generated via conventional techniques. In one embodiment, step 510 may be implemented to modify a given design option 222 in order to incorporate landowner feedback received via configuration data 242 while maintaining compliance with construction regulations and adherence to financial targets.

In sum, a design engine is configured to automatically generate designs for multi-family housing projects that simultaneously meet local construction regulations while also meeting specific financial targets. The design engine includes a design analyzer that generates design trends based on a database of historical designs. A feature extractor within the design analyzer performs a geometrical analysis of the historical designs to generate a library of features. A feature parameterizer within the design analyzer performs a parameterization process to generate one or more parametric values for each feature. A parameter correlator within the design analyzer compares different subsets of parametric values to identify relationships between those values. A trend aggregator identifies relationships that occur across multiple historical designs to determine a set of design trends. The design engine generates design options using these design trends.

The design engine also includes a site analyzer, a design generator, and a design evaluator. The site analyzer generates design criteria based on relevant construction regulations. The design generator generates design options that reflect the design trends discussed above while also complying with the construction regulations set forth in the design criteria. The design evaluator analyzes the design options and generates various design metrics. The design metrics describe specific geometric properties of the design options as well as various financial projections associated with those design options. Based on the design metrics, the design generator generates additional design options that better meet the design criteria. The design engine and design evaluator operate iteratively in this manner to generate successively improved design options. During or after any given iteration, one or more of the design options can be modified based on user input. Subsequently, as needed, the modified design option(s) can be brought into compliance with construction regulations and/or modified to improve financial performance.

At least one technical advantage of the disclosed techniques relative to the prior art is that the disclosed techniques can be incorporated into a CAD application to enable the CAD application to automatically generate designs having design features that promote both regulatory compliance and financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to modify a given design relative to landowner feedback to include design features that promote the feasibility and/or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to generate designs that incorporate design elements derived from previously successful designs, further promoting design feasibility and/or desirability. These technical advantages represent tangible and meaningful technological improvements over conventional CAD applications.

1. Some embodiments include a computer-implemented method for generating designs for multi-family housing projects via a computer-aided design (CAD) application, the method comprising generating, via a feature extractor included in the CAD application, a set of features based on a geometric analysis of a plurality of historical designs, generating, via a feature parameterizer included in the CAD application, a set of parametric values based on a parameterization of the set of features, determining, via a parametric correlator included in the CAD application, a first correlation between a first subset of parametric values and a second subset of parametric values included in the set of parametric values, generating, via a trend aggregator included in the CAD application, a first design trend based on the first correlation, and generating a first design option based on the first design trend.

2. The computer-implemented method of clause 1, wherein generating the set of features comprises determining a set of geometric attributes associated with the plurality of geometric designs, wherein each geometric attribute included in the set of geometric attributes comprises a group of pixels.

3. The computer-implemented method of any of clauses 1-2, wherein generating the set of parametric values comprises generating one or more numeric values for each feature included in the set of features.

4. The computer-implemented method of any of clauses 1-3, wherein determining the first correlation comprises determining that at least a portion of the first subset of parametric values is proportional to at least a portion of the second subset of parametric values.

5. The computer-implemented method of any of clauses 1-4, wherein generating the first design trend comprises determining that the first correlation corresponds to a second correlation that is derived from a third subset of parametric values and a fourth subset of parametric values included in the set of parametric values.

6. The computer-implemented method of any of clauses 1-5, wherein generating the first design option comprises generating one or more features to be included in the design option based on the first design trend.

7. The computer-implemented method of any of clauses 1-6, wherein a first feature included in the set of features comprises a one-dimensional geometric shape or a two-dimensional geometric shape.

8. The computer-implemented method of any of clauses 1-7, wherein a first parametric value included in the set of parametric values comprises one or more vertices that define a geometric shape.

9. The computer-implemented method of any of clauses 1-8, wherein the first correlation includes a proportionality constant that relates the first subset of parametric values to the second set of parametric values.

10. The computer-implemented method of any of clauses 1-9, wherein the first design trend comprises a geometry construction rule for generating design geometry.

11. Some embodiments include a non-transitory computer-readable medium storing program instructions that, when executed by a processor, cause the processor to generate designs for multi-family housing projects via a computer-aided design (CAD) application by performing the steps of generating, via a feature extractor included in the CAD application, a set of features based on a geometric analysis of a plurality of historical designs, generating, via a feature parameterizer included in the CAD application, a set of parametric values based on a parameterization of the set of features, determining, via a parametric correlator included in the CAD application, a first correlation between a first subset of parametric values and a second subset of parametric values included in the set of parametric values, generating, via a trend aggregator included in the CAD application, a first design trend based on the first correlation, and generating a first design option based on the first design trend.

12. The non-transitory computer-readable medium of clause 11, wherein the step of generating the set of features comprises determining a set of geometric attributes associated with the plurality of geometric designs, wherein each geometric attribute included in the set of geometric attributes comprises a group of pixels.

13. The non-transitory computer-readable medium of any of clauses 11-12, wherein the step of generating the set of parametric values comprises generating one or more numeric values for each feature included in the set of features.

14. The non-transitory computer-readable medium of any of clauses 11-13, wherein the step of determining the first correlation comprises determining that at least a portion of the first subset of parametric values is proportional to at least a portion of the second subset of parametric values.

15. The non-transitory computer-readable medium of any of clauses 11-14, wherein the step of generating the first design trend comprises determining that the first correlation corresponds to a second correlation that is derived from a third subset of parametric values and a fourth subset of parametric values included in the set of parametric values.

16. The non-transitory computer-readable medium of any of clauses 11-15, wherein the step of generating the first design option comprises generating one or more features to be included in the design option based on the first design trend.

17. The non-transitory computer-readable medium of any of clauses 11-16, wherein a first feature included in the set of features comprises a one-dimensional geometric shape or a two-dimensional geometric shape.

18. The non-transitory computer-readable medium of any of clauses 11-17, wherein the first design option includes a first feature that is derived from the first design trend and generated based on a property boundary associated with a parcel of land that corresponds to the first design option.

19. The non-transitory computer-readable medium of any of clauses 11-18, wherein the first design trend complies with at least a first construction regulation associated with a first parcel of land that corresponds to the first design option.

20. Some embodiments include a system, comprising a memory storing a computer-aided design (CAD) application, and a processor that, when executing the CAD application, is configured to perform the steps of generating, via a feature extractor included in the CAD application, a set of features based on a geometric analysis of a plurality of historical designs, generating, via a feature parameterizer included in the CAD application, a set of parametric values based on a parameterization of the set of features, determining, via a parametric correlator included in the CAD application, a first correlation between a first subset of parametric values and a second subset of parametric values included in the set of parametric values, generating, via a trend aggregator included in the CAD application, a first design trend based on the first correlation, and generating a first design option based on the first design trend.

Any and all combinations of any of the claim dements recited in any of the claims and/or any dements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs for multi-family housing projects via a computer-aided design (CAD) application, the method comprising:
generating, via a feature extractor included in the CAD application, a set of features based on a geometric analysis of a plurality of historical designs;
generating, via a feature parameterizer included in the CAD application, a set of parametric values based on a parameterization of the set of features;
determining, via a parametric correlator included in the CAD application:
a first correlation between a first subset of parametric values and a second subset of parametric values included in the set of parametric values, and
a second correlation based on at least a third subset of parametric values included in the set of parametric values;
determining, via a trend aggregator included in the CAD application, that the first correlation corresponds to the second correlation;
in response, generating, via the trend aggregator, a first design trend based on the first correlation and the second correlation; and
generating a first design option based on the first design trend.

2. The computer-implemented method of claim 1, wherein generating the set of features comprises determining a set of geometric attributes associated with the plurality of geometric designs, wherein each geometric attribute included in the set of geometric attributes comprises a group of pixels.

3. The computer-implemented method of claim 1, wherein generating the set of parametric values comprises generating one or more numeric values for each feature included in the set of features.

4. The computer-implemented method of claim 1, wherein determining the first correlation comprises determining that at least a portion of the first subset of parametric values is proportional to at least a portion of the second subset of parametric values.

5. The computer-implemented method of claim 1, wherein the second correlation is derived from the third subset of parametric values and a fourth subset of parametric values included in the set of parametric values.

6. The computer-implemented method of claim 1, wherein generating the first design option comprises generating one or more features to be included in the design option based on the first design trend.

7. The computer-implemented method of claim 1, wherein a first feature included in the set of features comprises a one-dimensional geometric shape or a two-dimensional geometric shape.

8. The computer-implemented method of claim 1, wherein a first parametric value included in the set of parametric values comprises one or more vertices that define a geometric shape.

9. The computer-implemented method of claim 1, wherein the first correlation includes a proportionality constant that relates the first subset of parametric values to the second subset of parametric values.

10. The computer-implemented method of claim 1, wherein the first design trend comprises a geometry construction rule for generating design geometry.

11. A non-transitory computer-readable medium storing program instructions that, when executed by a processor, cause the processor to generate designs for multi-family housing projects via a computer-aided design (CAD) application by performing the steps of:
generating, via a feature extractor included in the CAD application, a set of features based on a geometric analysis of a plurality of historical designs;
generating, via a feature parameterizer included in the CAD application, a set of parametric values based on a parameterization of the set of features;
determining, via a parametric correlator included in the CAD application;
a first correlation between a first subset of parametric values and a second subset of parametric values included in the set of parametric values, and
a second correlation based on at least a third subset of parametric values included in the set of parametric values;
determining, via a trend aggregator included in the CAD application, that the first correlation corresponds to the second correlation;
in response, generating, via the trend aggregator, a first design trend based on the first correlation and the second correlation; and
generating a first design option based on the first design trend.

12. The non-transitory computer-readable medium of claim 11, wherein the step of generating the set of features comprises determining a set of geometric attributes associated with the plurality of geometric designs, wherein each geometric attribute included in the set of geometric attributes comprises a group of pixels.

13. The non-transitory computer-readable medium of claim 11, wherein the step of generating the set of parametric values comprises generating one or more numeric values for each feature included in the set of features.

14. The non-transitory computer-readable medium of claim 11, wherein the step of determining the first correlation comprises determining that at least a portion of the first subset of parametric values is proportional to at least a portion of the second subset of parametric values.

15. The non-transitory computer-readable medium of claim 11, wherein the second correlation is derived from the third subset of parametric values and a fourth subset of parametric values included in the set of parametric values.

16. The non-transitory computer-readable medium of claim 11, wherein the step of generating the first design option comprises generating one or more features to be included in the design option based on the first design trend.

17. The non-transitory computer-readable medium of claim 11, wherein a first feature included in the set of features comprises a one-dimensional geometric shape or a two-dimensional geometric shape.

18. The non-transitory computer-readable medium of claim 11, wherein the first design option includes a first feature that is derived from the first design trend and generated based on a property boundary associated with a parcel of land that corresponds to the first design option.

19. The non-transitory computer-readable medium of claim 11, wherein the first design trend complies with at least a first construction regulation associated with a first parcel of land that corresponds to the first design option.

20. A system, comprising:
a memory storing a computer-aided design (CAD) application; and
a processor that, when executing the CAD application, is configured to perform the steps of:

generating, via a feature extractor included in the CAD application, a set of features based on a geometric analysis of a plurality of historical designs,
generating, via a feature parameterizer included in the CAD application, a set of parametric values based on a parameterization of the set of features,
determining, via a parametric correlator included in the CAD application:
 a first correlation between a first subset of parametric values and a second subset of parametric values included in the set of parametric values, and
 a second correlation based on at least a third subset of parametric values included in the set of parametric values,
determining, via a trend aggregator included in the CAD application, that the first correlation corresponds to the second correlation,
in response, generating, via the trend aggregator, a first design trend based on the first correlation and the second correlation, and
generating a first design option based on the first design trend.

* * * * *